(12) United States Patent
Swan et al.

(10) Patent No.: US 6,970,206 B1
(45) Date of Patent: Nov. 29, 2005

(54) METHOD FOR DEINTERLACING INTERLACED VIDEO BY A GRAPHICS PROCESSOR

(75) Inventors: Philip L. Swan, Richmond Hill (CA); Edward G. Callway, Toronto (CA)

(73) Assignee: ATI International SRL, Christchurch (BB)

( * ) Notice: Subject to any disclaimer, the term of this patent is extended or adjusted under 35 U.S.C. 154(b) by 0 days.

(21) Appl. No.: 09/553,143

(22) Filed: Apr. 20, 2000

(51) Int. Cl.⁷ .......................... H04N 11/20; H04N 7/01
(52) U.S. Cl. ...................... 348/448; 348/441; 348/458
(58) Field of Search ................................ 348/441, 448, 348/449, 450, 451, 452, 458; 345/430, 431; H04N 11/20, 7/01

(56) References Cited

U.S. PATENT DOCUMENTS

| | | | |
|---|---|---|---|
| 4,472,732 A | 9/1984 | Bennett et al. | |
| 4,631,750 A | 12/1986 | Gabriel et al. | |
| 4,680,628 A | 7/1987 | Wojcik et al. | |
| 4,740,842 A | 4/1988 | Annegarn et al. | |
| 4,908,874 A | 3/1990 | Gabriel | |
| 4,941,045 A | 7/1990 | Birch | |
| 4,947,251 A | 8/1990 | Hentschel | |
| 4,982,280 A | 1/1991 | Lyon et al. | |
| 4,989,090 A | 1/1991 | Campbell et al. | |
| 5,014,119 A | 5/1991 | Faroudja | |
| 5,046,164 A | 9/1991 | Hurst, Jr. | |
| 5,128,791 A | 7/1992 | LeGall et al. | |
| 5,134,480 A | 7/1992 | Wang et al. | |
| 5,151,783 A | 9/1992 | Faroudja | |
| 5,159,451 A | 10/1992 | Faroudja et al. | |
| 5,237,414 A | 8/1993 | Faroudja | |
| 5,289,305 A | 2/1994 | Lake, Jr. | |
| 5,327,240 A | 7/1994 | Golston et al. | |
| 5,408,270 A | 4/1995 | Lim | |
| 5,428,398 A | 6/1995 | Faroudja | |
| 5,467,138 A | 11/1995 | Gove | |
| 5,508,746 A | 4/1996 | Lim | |
| 5,596,371 A | 1/1997 | Pakhchyan et al. | |
| 5,602,654 A | 2/1997 | Patti et al. | |
| 5,621,470 A | * 4/1997 | Sid-Ahmed | 348/448 |
| 5,661,525 A | 8/1997 | Kovacevic et al. | |
| 5,754,248 A | * 5/1998 | Faroudja | 348/474 |
| 5,943,099 A | 8/1999 | Kim | |
| 6,118,488 A | * 9/2000 | Huang | 348/452 |
| 6,121,978 A | 9/2000 | Miler | |
| 6,208,350 B1 | * 3/2001 | Herrera | 345/430 |
| 6,239,842 B1 | * 5/2001 | Segman | 348/448 |
| 6,459,454 B1 | * 10/2002 | Walters | 348/448 |

\* cited by examiner

*Primary Examiner*—John Miller
*Assistant Examiner*—Trang U. Tran
(74) *Attorney, Agent, or Firm*—Vedder, Price, Kaufman & Kammholz, P.C.

(57) ABSTRACT

A method for deinterlacing interlaced video using a graphics processor includes receiving at least one instruction for a 2D/3D engine to facilitate creation of an adaptively deinterlaced frame image from at least a first interlaced field. The method also includes performing, by the 2D/3D engine, at least a portion of adaptive deinterlacing based on at least the first interlaced field, in response to the at least one instruction to produce at least a portion of the adaptively deinterlaced frame image. Once the information is deinterlaced, the method includes retrieving, by a graphics processor display engine, the stored adaptively deinterlaced frame image generated by the 2D/3D engine, for display on one or more display devices. The method also includes issuing 2D/3D instructions to the 2D/3D engine to carry out deinterlacing of lines of video data from interlaced fields. This may be done, for example, by another processing device, such as a host CPU, or any other suitable processing device.

23 Claims, 4 Drawing Sheets

METHOD FOR DEINTERLACING INTERLACED VIDEO BY A GRAPHICS PROCESSOR

RELATED CO-PENDING APPLICATION

This is a related application to an application entitled, "Method and Apparatus for Deinterlacing Video," having Ser. No. 09/539,572 filed on Mar. 31, 2000 and owned by instant assignee and incorporated by reference.

FIELD OF THE INVENTION

The invention relates generally to methods and devices for de-interlacing video for display on a progressive display and more particularly to methods and apparatus for de-interlacing interlaced content using a 2D/3D engine.

BACKGROUND OF THE INVENTION

Progressive display devices display all lines of an image every refresh. In contrast, interlaced display devices, such as NTSC and PAL television displays, typically display images using even and odd line interlacing. To display interlaced video on a progressive display, video rendering systems have to generate pixel data for scan lines that are not received in time for the next frame update. This process is called de-interlacing. When such interlaced signals are received for display on a progressive computer display, picture quality problems can arise especially when motion is occurring in the picture where inferior methods of de-interlacing are used.

The problem exists particularly for personal computers having multimedia capabilities since interlaced video information received from conventional video tapes, cable television broadcasters (CATV), digital video disks (DVD's) and direct broadcast satellite (DBS) systems must be de-interlaced for suitable display on a progressive (non-interlaced based) display device.

A current video compression standard, known as MPEG-2 specifies the compression format and decoding format for interlaced and non-interlaced video picture information. MPEG-2 video streams have picture data divided as blocks of data. These blocks of data are referred to as macroblocks in the MPEG-2 standard. Generally, a macroblock of data is a collection of Y, Cr, Cb (color space) blocks which have common motion parameters. Therefore, a macroblock of data contains a section of the luminance component and spatially corresponding chrominance components. A macroblock of data can either refer to source, decoded data or to the corresponding coded data elements. Typically, a macroblock of data (macroblocks) consists of blocks of 16 pixels by 16 pixels of Y data and 8 by 8, or 16 by 16 pixels of Cr and Cb data in one field or frame of picture data.

Generally, in MPEG-2 systems, two fields of a frame may be coded separately to form two field pictures. Alternatively, the two fields can be coded together as a frame. This is known generally as a frame picture. Both frame pictures and field pictures may be used in a single video sequence. A picture consists of a luminance matrix Y, and two chrominance matrices (Cb and Cr).

MPEG-2 video streams also include data known motion vector data that is solely used by a decoder to efficiently decompress the encoded macroblock of data. A motion vector, referred to herein as a decoding motion vector, is a two-dimensional vector used for motion compensation that provides an offset from a coordinate position in a current picture to the coordinates in a reference picture. The decoder uses the decoding motion vector data stream to reference pixel data from frames already decoded so that more compact difference data can be sent instead of absolute data for those referenced pixels or macroblocks. In other words, the motion vector data is used to decompress the picture data in the video stream. Also, zero decoding motion vectors may indicate that there was no change is pixel data from a previously decoded picture.

In MPEG-2 video streams, decoding motion vectors are typically assigned to a high percentage of macroblocks. Macroblocks can be in either field pictures or frame pictures. When in a field picture it is field predicted. When in a frame picture, it can be field predicted and frame predicted.

A macroblock of data defined in the MPEG-2 standard includes among other things, macroblock mode data, decoding motion vector data and coded block pattern data. Macroblock mode data are bits that are analyzed for de-interlacing purposes. For example, macroblock mode data can include bits indicating whether the data is intracoded. Coded block pattern data are bits indicating which blocks are coded.

Intracoded macroblocks are blocks of data that are not temporarily predicted from a previously reconstructed picture. Non-intracoded macroblocks have a decoding motion vector(s) and are temporarily predicted from a previously reconstructed picture.

Several basic ways of de-interlacing interlaced video information include a "weave" method and a "bob" method. With the "weave", or merge method, successive even and odd fields are merged. Each frame to be displayed is constructed by interleaving the scan lines of a pair of fields. This "weave" method is generally most effective with areas of a picture that do not have motion over successive frames because it provides more pixel data detail for non-moving objects. However, when motion does occur, artifacts appear in the form of double images of a moving object. An artifact called "Comb Tearing" or "Feathering" appears around the periphery of a horizontally moving object causing poor image quality. Images with vertically motion also have artifacts.

In contrast to the "weave" method, the "bob" method displays single fields as frames. The missing scan lines are interpolated from available lines in the filed making the frame rate the same as the original field rate. The most often used methods are line repetition, line averaging and edge-adaptive spatial interpolation. Again, this de-interlacing method is also not typically used with some form of motion detection so that non-moving images can appear to be blurry from loss of image detail. This can result from inaccurate interpolation of pixel data. The "bob" technique introduces flicker that is noticeable in video sequences with no motion. This occurs because even when the scene is static, two different frames are created—one based on the even field and one based on the odd field. These frames are generally different. Where they are different, flicker occurs as the display alternates between the two frames.

There are a number of techniques categorized as motion adaptive de-interlacing. These use different de-interlacing strategies in picture areas with and without motion. Generally, "bob" is used in picture areas with motion and "weave" is used in picture areas without motion. Additional discussion on video processing techniques can be found in a book entitled "Digital Video Processing," written by A. Murat Tekalp and published by Prentice Hall. Often, separate de-interlacers and/or separate motion detection hardware is used to carryout the above methods. However, separate de-interlacers and motion detection hardware can add additional cost to a graphics processor.

Graphics processors are known to include 2D/3D engines that fetch data from a frame buffer and blend pixels together to render an image and place the blended data back in the frame buffer. The frame buffer is memory accessible by the graphics processor. Such graphics processors are also known to include display engines which obtain rendered images from the frame buffer and may subsequently perform simple deinterlacing operations (such as "bob" and "weave") but do not typically rewrite the deinterlaced information back to the frame buffer. As known in the art, the specifics of operations supported by 2D/3D engines vary. Also, it is not uncommon among 2D/3D engines for the same operation to use a different number of passes on different chips. Lighting and multi-texture affects are examples of features where different implementations partition the signal processing steps differently to achieve a tradeoff between die area, complexity, memory bandwidth, and performance. The feature sets of 2D/3D engines evolve rapidly to make them more and more efficient at the tasks for which they are most frequently programmed.

The amount of signal processing (and thus the sophistication) of a deinterlacing algorithm that is implemented into a display engine will most likely lag behind an "off line" deinterlacing algorithm.

Display engine based deinterlacing solutions have less time in which to perform the needed signal processing. The deinterlaced pixels typically have to be produced at a time coincident with a display device's timing. If the deinterlaced image is displayed in a window, the deinterlaced image has to be produced during the time the portion of the display containing the window is refreshed. This means that the data fetches and signal processing operations have to occur in a shorter period of time than they would otherwise have to. For example, if the display engine's timing requirements could be ignored, a deinterlaced NTSC image could be produced every time a new field was received, or in $1/60^{th}$ of a second. However, with the timing requirements of a 100 Hz refresh rate CRT, the image has to be produced in $1/100^{th}$ of a second. If the video window on the display were half the height of the display, then time available is $1/200^{th}$ of a second.

Display engine based deinterlacing solutions must be replicated if the display engine is required to asynchronously drive more than one display device at a time. Because there is no synchronicity (i.e. one display my be running at 85 Hz while the other is running at 100 Hz), the deinterlacing signal processing can not be shared between the displays.

Also, display engine clocks typically run very fast (350 MHz today) compared to the clocks used processing digital NTSC and PAL data (28–35 MHz). It is technically challenging to add complex signal processing hardware in a high speed digital environment.

The order in which display pixels are obtained is typically controlled by the display device which influences the way in which pixels are fetched. For a display engine to perform advanced deinterlacing that requires the inspection of more source pixels, additional data needs to be fetched above and beyond the data needed for a simple "bob" or "weave" deinterlacing and display. As memory bandwidth is precious to a high performance graphics chip, additional on-chip memories are often used to reduce the amount of refetching required, thereby increasing the cost of the device instead.

For all these reasons, the amount of signal processing (and thus the sophistication) of a deinterlacing algorithm that is implemented into a display engine will most likely lag behind an "off line" deinterlacing algorithm. Accordingly, there is a need for a graphics processor that performs non-display engine based deinterlacing.

As noted above, additional hardware that performs deinterlacing off-line, and thus at a more leisurely pace, can have a reduced signal processing requirement. However, such hardware requires expensive hardware just to give it access to the graphics chip's main memory. This hardware includes an additional arbitration channel in the memory controller. It requires additional buffers to buffer data while waiting for an opportunity to write, and to quickly burst the data when that opportunity comes. It requires additional buffers to receive high speed bursts of data for reads, an to store up data for use until the next read can occur. It requires logic to generate addresses and logic to cross clock boundaries. It may even require logic to maintain cache coherency with other hardware accessing the same memory. Therefore, while there certainly are solutions to signal processing problem using dedicated off-line hardware, there are also significant overhead costs to adding such dedicated hardware. These solutions will take time to develop and add to graphics chips. There is a need for a solution that can be incorporated in existing as well as future graphic processing chips.

BRIEF DESCRIPTION OF THE DRAWINGS

The invention will be more readily understood with reference to the following drawings wherein.

DETAILED DESCRIPTION OF A PREFERRED EMBODIMENT OF THE INVENTION

A method for deinterlacing interlaced video using a graphics processor includes receiving at least one instruction for a 2D/3D engine, such as a rendering engine, drawing engine or other suitable structure that receives or reads in image data, renders image data and writes out image data, to facilitate creation of an adaptively deinterlaced frame image from at least a first interlaced field. The method also includes performing, by the 2D/3D engine, at least a portion of adaptive deinterlacing based on at least the first interlaced field, in response to the at least one instruction to produce at least a portion of the adaptively deinterlaced frame image. Once the information is deinterlaced, the method includes retrieving, by a graphics processor display engine, the stored adaptively deinterlaced frame image generated by the 2D/3D engine, for display on one or more display devices. The method also includes issuing 2D/3D instructions to the 2D/3D engine to carry out deinterlacing of lines of video data from interlaced fields. This may be done, for example, by another processing device, such as a host CPU, or any other suitable processing device, such as an embedded setup engine, programmable element, or hard wired state machine.

Accordingly, a software-based adaptive deinterlacing technique is performed by a 2D/3D engine so that additional de-interlacing hardware is not required for some conventional graphics processors. In addition, adaptive deinterlacing can be performed on a per pixel basis in contrast to many conventional display engine-based deinterlacing processes. Accordingly, the 2D/3D engine-based deinterlacing is not constrained by the types of display devices. For example, the method may operate slower if desired and store the adaptively deinterlaced information in the frame buffer so that the deinterlacing is not fixed to a display rate of the display device. In addition, a 3D engine can work on smaller rectangular regions at one time and is not constrained to a line order as may be the case with a display engine. Other advantages will be recognized by one of ordinary skill in the art.

Figure 1:
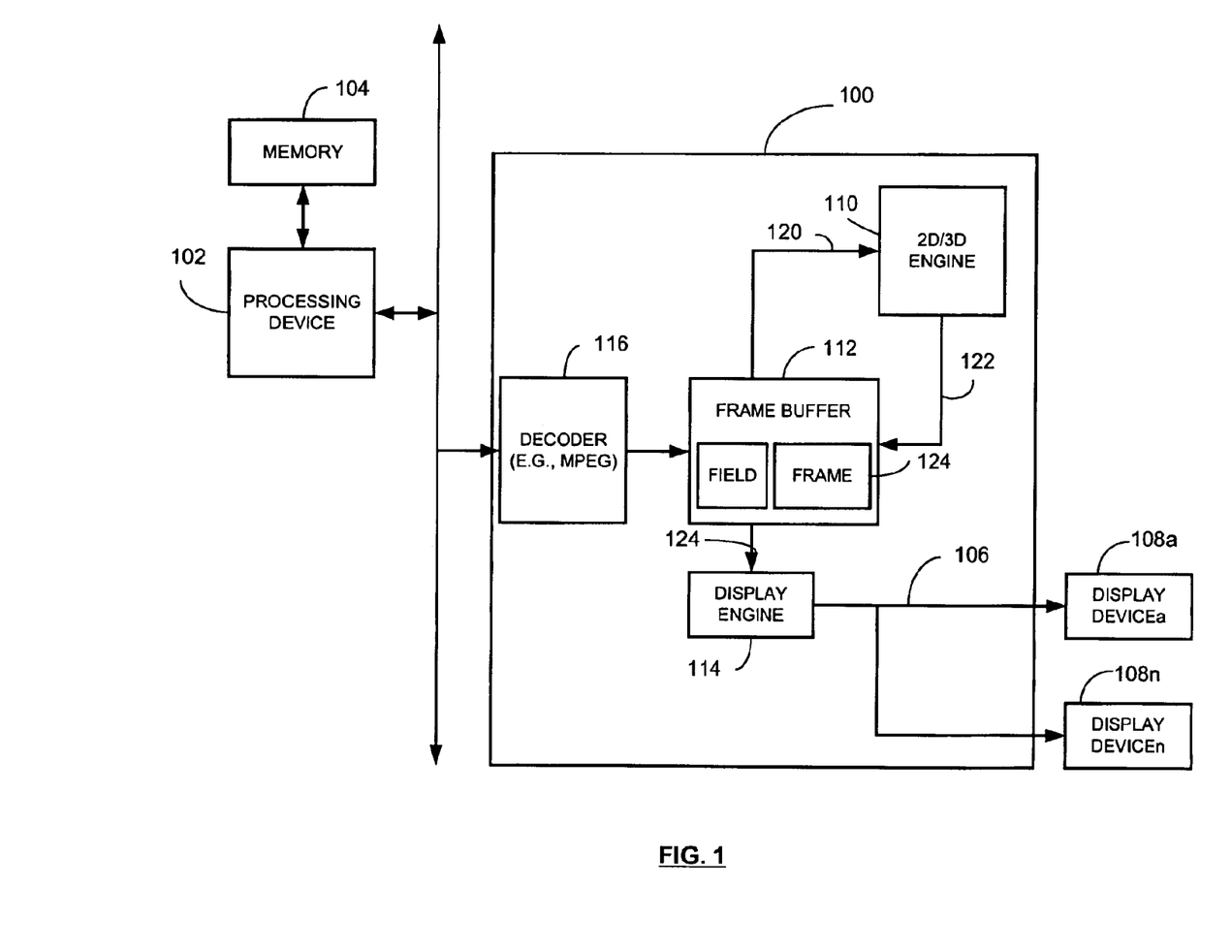
FIG. 1 is a block diagram illustrating a graphics processor in accordance with one embodiment of the invention.

FIG. 1 illustrates one example of a graphics processor 100 operatively coupled to a processing device 102, such as a host processor in an Internet appliance, laptop computer, or any other suitable device. The processing device 102 has associated memory 104 that contains operating code to control the operation of the processing device 102, as known in the art. The graphics processor 100 outputs display data 106 to one or more display devices 108a–108n.

The graphics processor 100 includes a 2D/3D engine 110, a frame buffer 112, a display engine 114, and if desired, a video decoder 116, such as an MPEG decoder, video capture port, or analogue video decoder, as known in the art. Unlike conventional graphics processors, graphics processor 100 uses its 2D/3D engine 110 to perform adaptive deinterlacing on a pixel by pixel basis or on a line by line, region by region, or field by field basis, if desired. The 2D/3D engine receives interlaced fields data 120 from frame buffer 112. The frame buffer is shown to be inside the graphics processor for ease in explanation, but is is typically outside of the graphics processor. It will be recognized that the frame buffer may be located inside the graphics processor if desired. Interlaced fields are decoded by the decoder 116 and stored in the frame buffer in the form of interlaced fields as known in the art. The 2D/3D engine 110 may be a conventional 2D and/or 3D engine, as known in the art. For example, the 2D/3D engine performs conventional graphics processing functions based on instructions received from a processing device 102 which may be processing video or transferring video to the graphics processor 100. In one embodiment, the 2D/3D engine fetches the field data 120 and performs blending operations on a pixel by pixel basis and places the blended data back in the frame buffer as dynamically deinterlaced data 122 to form frames 124. The display engine 114 retrieves the dynamically deinterlaced data 122 in the form of de-interlaced frames 124 and outputs the frames on the display devices 108a–108n, as known in the art. Accordingly, the display engine 114 obtains images from the frame buffer and displays them on the display device. If desired, the display engine 114 may also perform additional blending, if desired, but typically does not rewrite the data back into the frame buffer.

The 2D/3D engine 110 retrieves the field data 120 by obtaining one or more lines from a first field, or a previous field, subsequent field, two fields or four fields apart from a current field, or any other suitable fields to perform adaptive deinterlacing, as desired. Adaptive deinterlacing algorithms will generally use these additional fields to determine if an area of the image is changing or not. Some advanced algorithms will attempt to track motion and compensate for it.

Figure 2A:
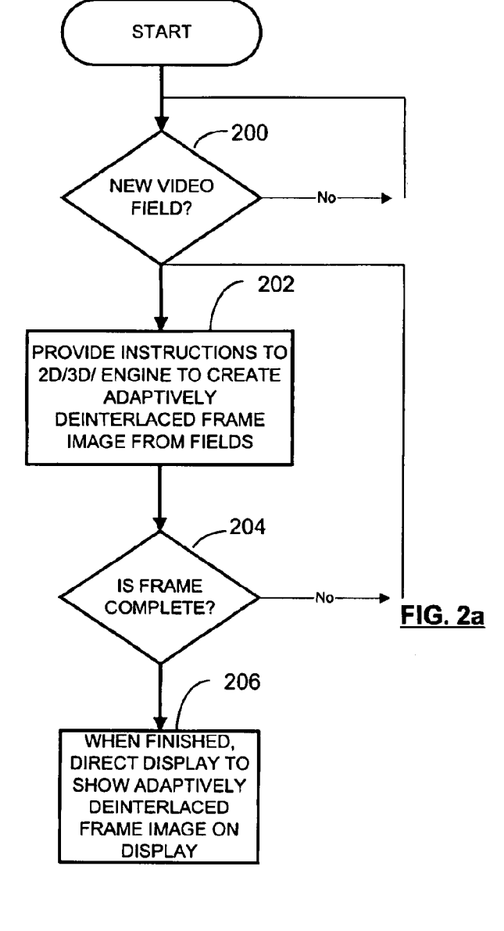
FIG. 2a is a flow charts illustrating one example of a method for deinterlacing from a perspective of a processing device operatively coupled to a graphics processor, in accordance with one embodiment of the invention.
Figure 2B:
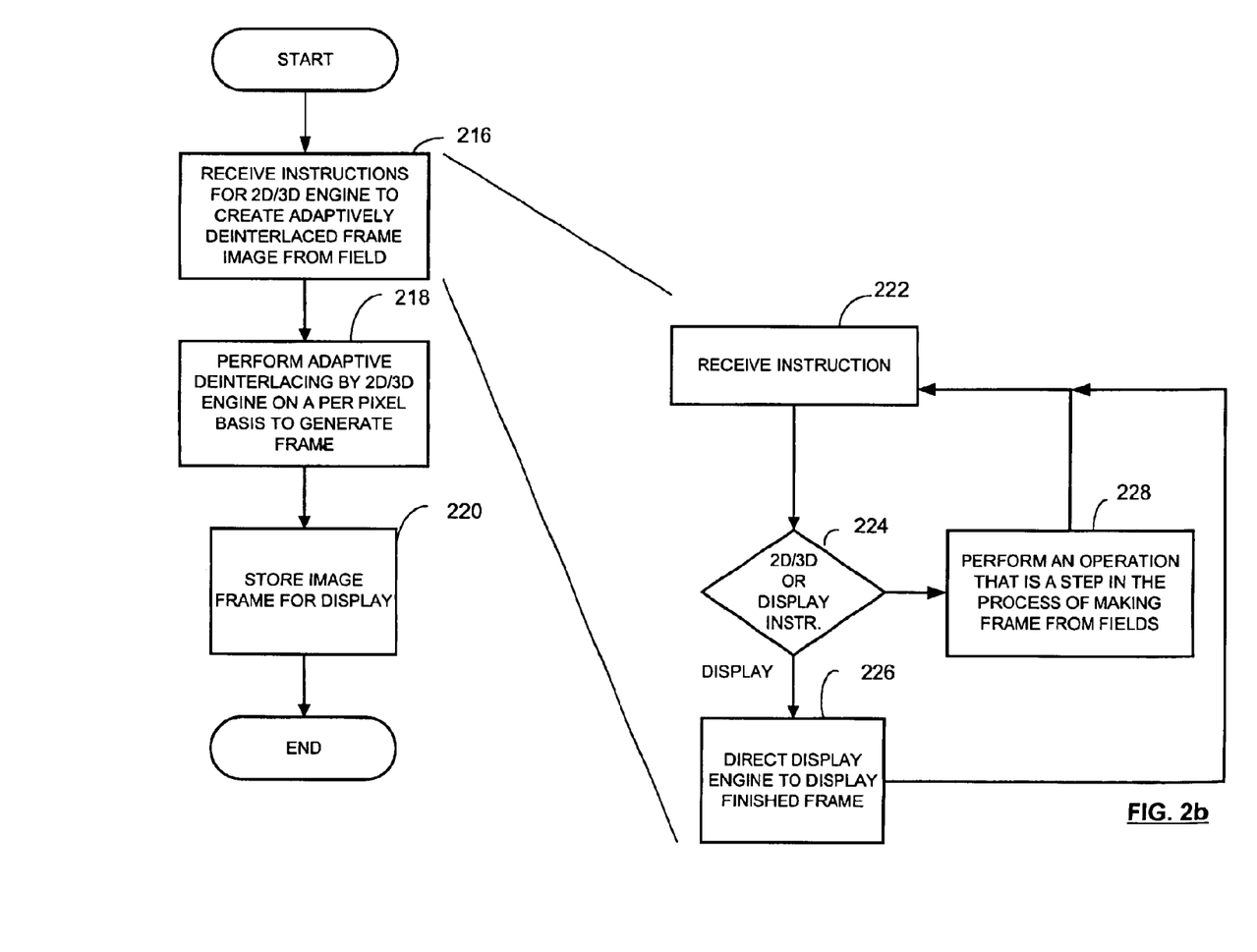
FIG. 2b is a flow chart illustrating one example of the operation of a graphics controller in accordance with one embodiment of the invention.
Figure 2C:
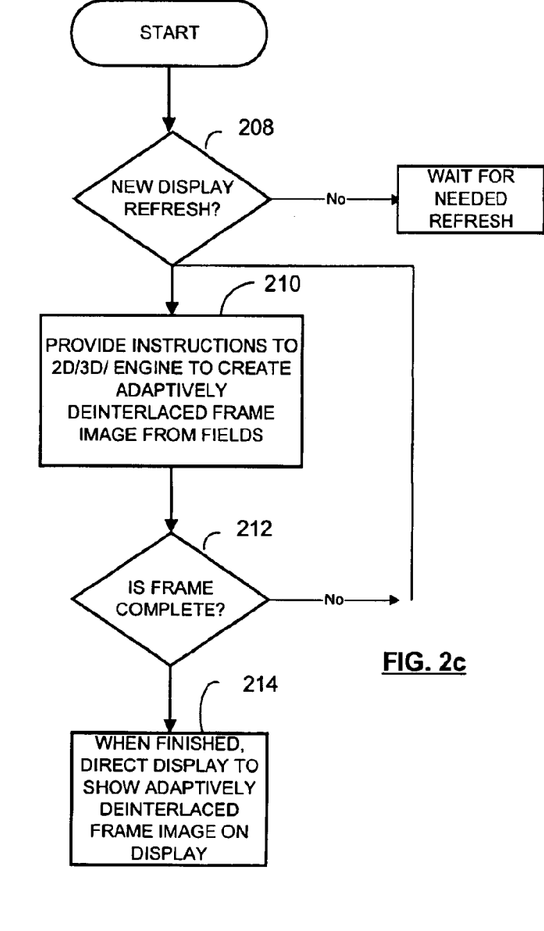
FIG. 2c is a flow charts illustrating another example of a method for deinterlacing from a perspective of a processing device operatively coupled to a graphics processor, in accordance with one embodiment of the invention.

Referring to FIGS. 1–2c, the operation of the graphics processor 100 in combination with the processing device 102 will be explained. As shown in block 200 of FIG. 2a, the processing device 102 determines if a new video field is needed. This may be determined, for example, by the graphics processor 100 generating an interrupt to the CPU or the CPU polling one or more status bits in a register associated with the graphics controller to indicate whether the graphics processor is ready to process and use another interlaced video field. As shown in block 202, the processing device 102 provides instructions to the 2D/3D engine 110 to create an adaptively deinterlaced frame image from a plurality of fields. Accordingly, the processing device 102 issues 2D/3D instructions to the 2D/3D engine to carry out deinterlacing lines of video data from interlaced fields on, for example, a pixel by pixel basis. As shown in block 204, the processing device 102 determines whether a frame is complete for display by the display engine 114. This may be determined, for example, based on a known time that it takes to generate a deinterlaced frame, based on a status register associated with the graphics controller 110, an interrupt-based notification by the graphics processor 100, or any other suitable mechanism.

As shown in block 206, the processing device 102 directs the display engine 114 to display the adaptively deinterlaced frame image on the appropriate display device. As shown in block 208, the process includes determining whether a new display refresh is required. New refreshes are required with a regular periodicity. Typically, at some point in the VBlank, a signal or interrupt is triggered. However, it is necessary to determine if a new deinterlaced image is required for the upcoming display refresh. This can depend on the temporal conversion algorithm that is chosen. In a simple case, the determination can include evaluating whether any new field information arrived since the last time an image was created. If the answer is yes, then a new deinterlaced frame is made. With temporal frame rate conversion, a new frame is created every time because the mix ratio of the fields/frames changes with time. However, for an off-line technique without temporal frame rate conversion, the process may include simply waiting for a new field of video information to arrive, and make a new frame when it does arrive. If the deinterlaced frames are double buffered, the display or displays can simply pick up the most recently deinterlaced frame.

If a new display refresh is required, the process continues to block 210 where the processor 102 provides instructions to the 2D/3D engine to create an adaptively deinterlaced frame image from appropriate fields. As shown in block 212, the processor 102 or software control, determines if a frame is complete. As shown in block 214, the processor 102 directs the display engine 114 to display the adaptively deinterlaced frame image on the display device. Referring back to block 208, if a new display refresh is not necessary, the process continues to wait until the appropriate time when a new display refresh is required.

FIG. 2b illustrates one example of a method for deinterlacing video information using a 2D/3D engine, in accordance with one embodiment of the invention. As shown in block 216, the method includes receiving at least one instruction, or a plurality of instructions, for the 2D/3D engine to create the adaptively deinterlaced frame image from field data. The instructions are typically received until a graphics processor instruction buffer(s) (not shown) is full. As shown in block 218, the method includes performing, by the 2D/3D engine 110, adaptive deinterlacing on a per pixel basis to generate the deinterlaced frame image. However, it will be recognized that de-interlacing may occur on a group of pixel basis, block basis, frame basis or any other suitable basis. As shown in block 220, the method includes storing the deinterlaced image frame for display by the display engine 114 into the frame buffer 112.

The deinterlacing is performed using conventional 2D or 3D instructions. Examples of the types of instruction that can be used to provide advanced deinterlacing include:

1) Instructions that cause the engine to convert "an absence of change between at least two fields" into "an array of values" where each value indicates the degree of change for a region of the image having at least one pixel; and 2) Instructions that use the array of values to influence the degree to which pixels in the frame are based on one field over another field.

In (1), "fields" can be done on the original fields directly, or on representations of the fields. Representations can include one color component of the field, or a downscaled version of the field, a compressed version of the field, etc.

In (1), aan absence of change can be obtained be measuring the absolute difference between two pixels in an image. This can be done directly with an operation that outputs the result of "abs(a–b)". If this instruction is not available, it may be sufficient to output the result of lut(a–b) for example, where "lut" is a look up table or pallette. If a–b is not available, then (a+not b)/2 provides an approximation that is generally close enough. If this is not available, then "not b" can be done in a first pass to make "c", and (a+c)/2 can be done with a scaling operation that most engines do support today.

In (2), the array of values can influence by affecting how pixels in different fields are weighted as they are combined to make a frame. Values control the selection of coefficients for a filtering operation. For example, if three fields were to be combined, then the array of values could be expanded into three arrays of coefficients. Each array of coefficients would be multiplied by a field, and the fields would be summed up to produce a frame. A simpler case would simply use the use the value to make an "either A or B" decision by comparing the value to a threshold, for example. The decision could select between a pixel(s) created using the "weave" method and a pixel(s) using the "bob" method. A mix of the two techniques would work as well. The value could affect a blend ratio that would blend a pixel(s) created using the "weave" method and a pixel(s) using the "bob" method.

Another example of deinterlacing instructions include:

1) Receiving instructions that cause the engine to convert "an absence of change between at least two fields" into "an array of values" where each value indicates the degree of change for a region of the image comprising at least one pixel.

2) Repeating operation (1) at least once with a motion vector offset to determine the degree of change given the offset. (If a value indicates no change, it is presumed that the motion vector correlates well with the pixels represented by the value).

3) Using the at least one array of values to influence the degree to which pixels in the frame are based on one field over another field. The relative positions of pixels may be defined in part by the offset associated with the array of values.

The step 216 of receiving instructions, such as those described above, for the 2D/3D engine to create the adaptively deinterlaced frame image is further illustrated by blocks 222–228. As shown in block 222, the graphics processor 100 receives the instruction for the 2D/3D engine. The graphics processor then determines whether the instruction is for the 2D/3D engine or for the display engine. As shown in block 226, if the instruction in the instruction buffer is for the display engine 114, the graphics processor directs the display engine 114 to display the finished frame from the frame buffer 112. Any of a number of things can direct the display engine, including interrupt routines running on the host, and state machines running in the hardware.

Referring back to block 224, if it is determined that the instruction in the graphics controller instruction buffer is a 2D/3D engine command, the process includes performing adaptive deinterlacing by the 2D/3D engine based on the instruction. For example, the method includes performing an operation that is a step in the process of making a deinterlaced frame from a plurality of fields. The process continues to evaluate the next instruction and continues until a completed frame is stored in the frame buffer. Thereafter, the display engine is then controlled to retrieve the stored adaptively deinterlaced frame image for display on a display device. It will be recognized that the display engine need not be controlled as indicated. Instead, if the completed frame is simply put in a place where the display engine displays from, then no control of the display is actually needed. If double buffering is needed to avoid tearing problems, the display could be designed so that it always ping-pongs between two or more buffers in a preprogrammed regular way. This solves the tearing problems without requiring control of the display. The 2D/3D engine may perform any suitable deinterlacing algorithm as desired. Preferably, the deinterlacing is performed on a pixel by pixel basis. "Adaptive" as used herein includes an implementation where one element of the algorithm makes a decision (e.g. motion/no motion) that affects whether algorithm "A" (e.g. bob) or algorithm "B" (e.g. weave) will be used to produce a deinterlaced pixel and also includes more general classes of filters, such as median filters or spatial-temporal filters as known in the art, that effectively utilize one mathematical transfer function that determines a suitable pixel value.

Figure 3:
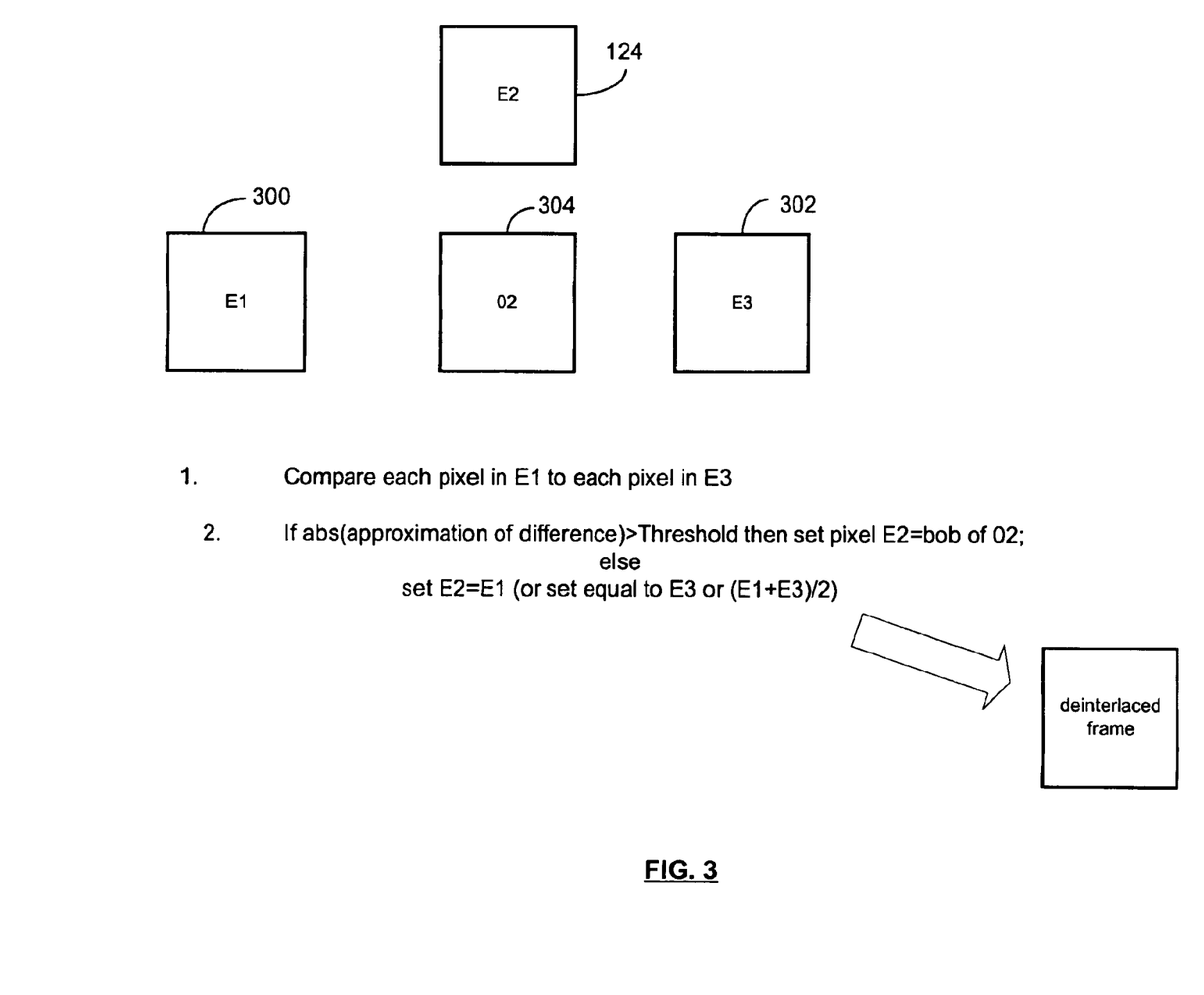
FIG. 3 illustrates one example of a method to provide adaptive deinterlacing by a 2D/3D engine in accordance with one embodiment of the invention.

Referring to FIG. 3, one algorithm performed by the 2D/3D engine to provide adaptive deinterlacing will be described. As shown, a plurality of even fields 300 and 302 may be stored in the frame buffer by the decoder 116 in addition to one or more odd fields 304. The adaptively deinterlaced frame image 124 can be a field or a complete frame. As shown, the 2D/3D engine compares, for example, each pixel in even field 300 to each corresponding pixel in even field 302. If the absolute value of the difference of the compared pixels is greater than a threshold, then the 2D/3D engine generates a corresponding pixel that is a "bob" of the odd field pixel 304 with the corresponding pixel of even field 300. Otherwise, the dynamically deinterlaced data 124 may be set equal to the even field 300 or if the difference is very small, the even fields 300 and 302 may be averaged. Any other suitable algorithm may also be used. Also, if desired, the 2D/3D engine can generate a de-interlaced line and have the display engine weave the line with other lines.

It will be recognized that a frame does not have to be complete for display of that frame to start, provided that the deinterlacing operations will finish writing the completed lines of data before the display reads these lines. The signal processing can be done "behind-the-scan". This is also true on the receiving side. It is not necessary for the entire field to have been received. For example, the deinterlacing can start when the even part of the field has been received.

Below in Table 1 is one of many examples, of an algorithm for de-interlacing video by a 2D and/or 3D engine using operations that are easily accelerated by using 2D and/or 3D instructions such as executable by an ATI Technologies Inc., Rage Pro™ graphics processor available from ATI Technologies Inc., Commerce Valley Drive, Thornhill Ontario, Canada.

TABLE 1

'This code illustrates an algorithm for deinetrlacing video
'using multiple alpha blit passes.
'SCREEN 12
FOR LogRange = 1 TO 6
   CLS
   Range = (2 ^ LogRange)
   'The alpha blended value represents the difference divided by two.
   'We want to add Range so that "-range to +Range" becomes
   '"0 to 2*Range". This can be approximated by alpha blending
   with white.
   PercentWhite = Range / 255
   PercentWhite = INT(PercentWhite * 255 + .5) / 255
   PercentOriginal = 1 − PercentWhite
   'Then detect if the difference is between 0 and 2*Range using
   a mask and colour
   'For example if +/−Range = +/−4, then we want to check for 0 to 7,
   'so we mask out bits 0 to 2, and check that the rest of the bits match.
   Mask = (&HFF * Range) AND &HFF
   PRINT "Range = +/−"; Range
   PRINT INT(PercentWhite * 255 + .5)
   PRINT HEX$(Mask)
   FOR a = 40 TO 40
      FOR b = 20 TO 80
         notB = (NOT b) AND 255
         BlendANotB = INT((a + notB). / 2)
         tempShftBlendANotB = (BlendANotB * PercentOriginal) +
         (255 * PercentWhite)
         ShftBlendANotB = INT(tempShftBlendANotB + .5)
         'The rest of the bits will match against &H80
         Similar = ((ShftBlendANotB AND Mask) = &H80)
         IF Similar THEN
            'PSET (a, b), 15
            PRINT a; b; tempShftBlendANotB;
            HEX$(ShftBlendANotB); " "; a − b
         ELSE
            'PSET (a, b), 15
         END IF
         'PRINT a; b; a − b, HEX$(BlendANotB); " ";
         HEX$(ShftBlendANotB)
      NEXT b
   NEXT a
   WHILE INKEY$ = " "
   WEND
NEXT The software, namely the executable instructions required to cause the processor 102 and the graphics processor 100 to operate as indicated above, may be stored in one or more storage mediums such as volatile or non-volatile memories, optical storage devices, magnetic storage devices, or any other suitable storage devices. It should be recognized that different variations of existing 2D/3D engines can make them more or less suitable for the signal processing needed for deinterlacing. Moreover, simple extensions or modifications to a 2D/3D engine can obviously make it more suitable. Depending on these specifics, the control logic will change so that, for example, multiple passes that are required to perform a step of an advanced deinterlacing algorithm can now be performed in one step.

It is anticipated that the deinterlacing control technology presented above will be accelerated through the addition of new signal processing operations (such as instructions that directly compare pixels to see if their differences exceed a threshold). It will also be accelerated by moving more of the control from the host processor to hardware "setup engines", "geometry engines", or other (possibly programmable) control elements. The algorithms may be reorganized (e.g. loops nested differently, or the image data processed a bit at time) so that less data is moved to and from "distant" memories such as the main frame buffer, and more data is retained in local storage elements such as on-chip caches, scratch pad RAM, or state elements.

The aforedescribed operation provides control technology that will use the signal processing functions of a 2D/3D engines to deinterlace an image using advanced deinterlacing techniques, without requiring new programming of general purpose microprocessors.

Using an existing 2D and/or 3D engine to perform the bulk of the actual signal processing for a sophisticated deinterlacing algorithm also has clear performance advantages over using a purely software implementation. In a typical computer, the 2D/3D engine is used instead of the host CPU to perform 2D and 3D for the same reasons. 2D and 3D engines specialize in image manipulation operations. They also have direct high bandwidth access to memory where the data is stored.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for de-interlacing interlaced video using a graphic processor comprising the steps of:
receiving at least one instruction for a 2-D/3-D engine to facilitate creation of an adaptively de-interlaced frame image from at least a first interlaced field; and
performing, by the 2-D/3-D engine, at least a portion of adaptive de-interlacing based on at least the first interlaced field in response to the at least one instruction to produce at least a portion of the adaptively de-interlaced frame image, wherein the at least a portion of adaptive de-interlacing is not based on a second interlaced field;
wherein the first interlaced field is alternating lines of the interlaced video.

2. The method of claim 1 including the step of storing the at least portion of the adaptively de-interlaced frame image for display.

3. The method of claim 2 including the step of retrieving, by a graphics processor display engine, the stored adaptively de-interlaced frame image for display on at least one display device.

4. The method of claim 1 wherein the step of performing adaptive de-interlacing by the 2-D/3-D engine includes executing 2D/3D instructions that result in performing median filtering.

5. The method of claim 1 wherein the step of performing adaptive de-interlacing by the 2-D/3-D engine includes executing 2D/3D instructions that result in performing spatio-temporal filtering.

6. The method of claim 1 including the step of controlling the 2D/3/D engine to perform the adaptive de-interlacing prior to display by a display engine.

7. The method of claim 1 including the step of issuing 2D/3D instructions to the 2D/3D engine to carry out de-interlacing of lines of video data from interlaced fields.

8. The method of claim 1 wherein the at least one instruction includes at least of a: line inverting instruction, a scaling instruction and a blend instruction.

9. The method of claim 1 including the step of determining whether the at least one instruction is for the 2D/3D engine or for a display engine.

10. A method for de-interlacing interlaced video using a graphic processor comprising the steps of:
determining whether at least one received instruction is for a 2D/3D engine or for a display engine;

receiving the at least one instruction for the 2-D/3-D engine to facilitate creation of an adaptively de-interlaced frame image from at least a first interlaced field;

performing, by the 2-D/3-D engine, at least a portion of adaptive de-interlacing based on at least the first interlaced field in response to the at least one instruction to produce at least a portion of the adaptively de-interlaced frame image, wherein the at least a portion of adaptive de-interlacing is not based on a second interlaced field; and retrieving, by a graphics processor display engine, the stored adaptively de-interlaced frame image, generated by the 2D/3D engine, for display on at least one display device;

wherein the first interlaced field is alternating lines of the interlaced video.

11. The method of claim 10 including the step of storing the at least portion of the adaptively de-interlaced frame image for display.

12. The method of claim 10 wherein the step of performing adaptive de-interlacing by the 2-D/3-D engine includes determining non-motion between a plurality of pixels based on spatial-temporal filtering.

13. The method of claim 10 including the step of controlling the 2D/3D engine to perform the adaptive de-interlacing prior to display by a display engine.

14. The method of claim 13 including the step of issuing 2D/3D instructions to the 2D/3D engine to carry out de-interlacing of lines of video data from interlaced fields.

15. The method of claim 10 wherein the at least one instruction includes at least of a: line inverting instruction, a scaling instruction and a blend instruction.

16. A storage medium containing executable instructions that when executed by one or more 2d/3d engines, causes the one or more 2D/3D engines to:

receive at least one instruction to facilitate creation of an adaptively de-interlaced frame image from at least a first interlaced field; and perform at least a portion of adaptive de-interlacing based on at least the first interlaced field in response to the at least one instruction to produce at least a portion of the adaptively de-interlaced frame image, wherein the at least a portion of adaptive de-interlacing is not based on a second interlaced field;

wherein the first interlaced field is alternating lines of the interlaced video.

17. The storage medium of claim 16 including instructions that causes the one or more 2D/3D engines to store the at least portion of the adaptively de-interlaced frame image for display.

18. The storage medium of claim 16 including instructions that causes one or more graphics processor display engines to retrieve the stored adaptively de-interlaced frame image for display on at least one display device.

19. The storage medium of claim 16 including instructions that causes the one or more 2D/3D engines to executing 2D/3D instructions that result in performing median filtering.

20. The storage medium of claim 16 including instructions that causes one or more processing devices to control the 2D/3D engine to perform the adaptive de-interlacing prior to display by a display engine.

21. The storage medium of claim 16 including instructions that causes one or more processing devices to issue 2D/3D instructions to the 2D/3D engine to carry out de-interlacing of lines of video data from interlaced fields on a pixel by pixel basis.

22. The storage medium of claim 16 wherein the at least one instruction includes at least of a: line inverting instruction, a scaling instruction and a blend instruction.

23. The storage medium of claim 16 including instructions that causes one or more graphics processors to determine whether the at least one instruction is for the 2D/3D engine or for a display engine.

* * * * *